(12) United States Patent
Kaku

(10) Patent No.: US 9,108,547 B2
(45) Date of Patent: Aug. 18, 2015

(54) VEHICLE SEAT

(75) Inventor: Hiroyuki Kaku, Tochigi (JP)

(73) Assignee: TS TECH CO., LTD., Saitama (JP)

( * ) Notice: Subject to any disclaimer, the term of this patent is extended or adjusted under 35 U.S.C. 154(b) by 0 days.

(21) Appl. No.: 13/809,082

(22) PCT Filed: Jul. 6, 2011

(86) PCT No.: PCT/JP2011/065491
§ 371 (c)(1),
(2), (4) Date: Jan. 8, 2013

(87) PCT Pub. No.: WO2012/005298
PCT Pub. Date: Jan. 12, 2012

(65) Prior Publication Data
US 2013/0106153 A1 May 2, 2013

(30) Foreign Application Priority Data

Jul. 9, 2010 (JP) .................................. 2010-157272
Jul. 9, 2010 (JP) .................................. 2010-157273
Jul. 9, 2010 (JP) .................................. 2010-157276
Jul. 9, 2010 (JP) .................................. 2010-157279

(51) Int. Cl.
*B60N 2/42* (2006.01)
*B60N 2/427* (2006.01)
*B60N 2/68* (2006.01)

(52) U.S. Cl.
CPC .......... *B60N 2/4235* (2013.01); *B60N 2/42709* (2013.01); *B60N 2/68* (2013.01)
USPC .................................. 297/216.13; 297/216.1

(58) Field of Classification Search
CPC ..... B60N 2/4235; B60N 2/42709; B60N 2/68
USPC ......................................... 297/216.13, 216.1
See application file for complete search history.

(56) References Cited

U.S. PATENT DOCUMENTS 6,299,239 B1 * 10/2001 Sagawa et al. ........... 296/187.12
7,448,674 B2 * 11/2008 Brunner et al. .......... 296/193.02

(Continued)

FOREIGN PATENT DOCUMENTS

| CN | 1133578 A | 10/1996 |
|---|---|---|
| JP | 10-42995 | 2/1998 |

(Continued)

OTHER PUBLICATIONS

Office Action issued in counterpart Chinese Patent Application No. 201180033842.1 (May 6, 2015) of co-pending U.S. Appl. No. 13/809,087, and corresponding English translation.

*Primary Examiner* — David R Dunn
*Assistant Examiner* — Jody Giacoman
(74) *Attorney, Agent, or Firm* — Hamre, Schumann, Mueller & Larson, P.C.

(57) ABSTRACT

A vehicle seat comprises: left and right side frames (4) which constitute left and right portions of a seat back frame (2); a reinforcing frame (pipe frame 5) disposed adjacent to one side frame (4) in a lateral direction, and configured to reinforce the side frame (4); and a force-receiving member (bracket 7) disposed adjacent to the one side frame (4), provided discretely from the reinforcing frame, and configured to receive a load from another member. The force-receiving member is disposed opposite to the reinforcing frame with the side frame 4 disposed therebetween, and directly fixed to the reinforcing frame.

14 Claims, 8 Drawing Sheets

(56) References Cited

U.S. PATENT DOCUMENTS

| | | | |
|---|---|---|---|
| 7,631,926 B2 * | 12/2009 | Fonseka et al. | 296/187.12 |
| 8,226,156 B2 * | 7/2012 | Shiono et al. | 296/193.02 |
| 8,292,353 B2 * | 10/2012 | Ishimaru et al. | 296/193.06 |
| 2002/0024241 A1 | 2/2002 | Umezawa et al. | |
| 2009/0021061 A1 * | 1/2009 | Yamaki et al. | 297/216.13 |
| 2010/0244485 A1 * | 9/2010 | Tanaka et al. | 296/187.08 |
| 2012/0068506 A1 * | 3/2012 | Yamaki et al. | 297/216.1 |

FOREIGN PATENT DOCUMENTS

| | | |
|---|---|---|
| JP | 11-2220088 | 8/1999 |
| JP | 2000-103275 | 4/2000 |
| JP | 2001-105947 | 4/2001 |
| JP | 2007-253887 | 10/2007 |
| JP | 2009-46112 | 3/2009 |
| JP | 2009-248818 | 10/2009 |
| WO | WO 95/11818 | 5/1995 |
| WO | WO 2009/044729 | 4/2009 |

* cited by examiner

FIG. 3
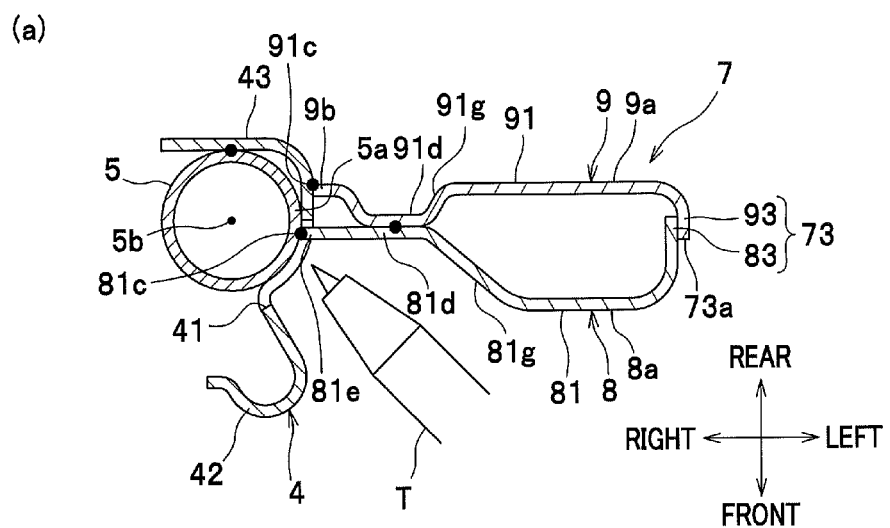
(b)
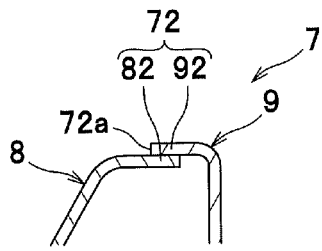
(c)
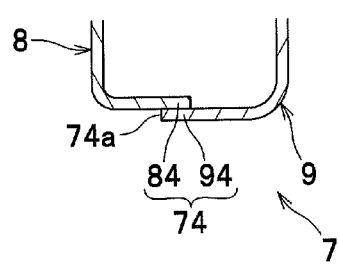

FIG. 8
(a)
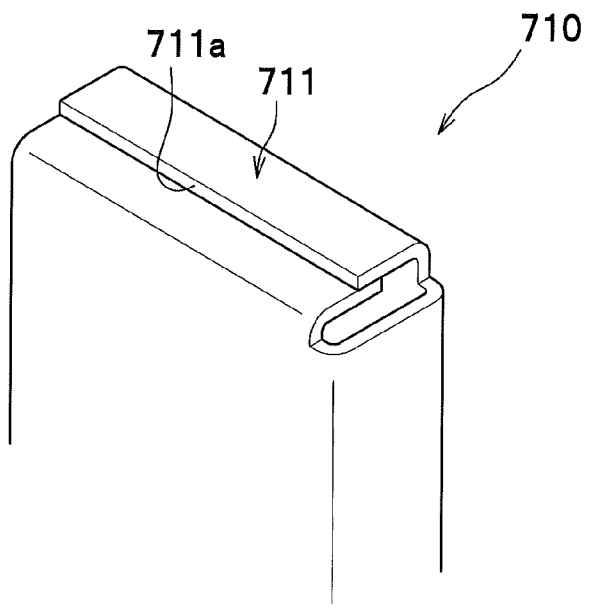
(b)
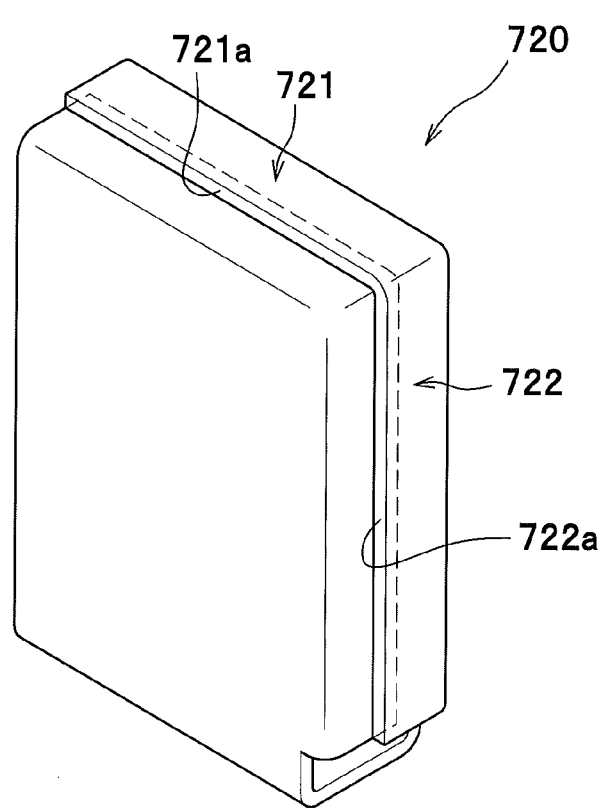

VEHICLE SEAT

TECHNICAL FIELD

The present invention relates to a vehicle seat in which a force-receiving member configured to receive a load imposed from another member on the vehicle seat is provided.

BACKGROUND ART

A vehicle seat comprising a pipe frame (reinforcing frame) shaped like a rectangular loop, a plate-like side frame disposed adjacent to a left or right outer side of the pipe frame, and a bracket (force-receiving member) fixed to a left or right outer side of the side frame has hitherto been known in the art (see Patent Literature 1). To be more specific, the side frame is formed to have dimensions such that it protrudes frontward and rearward beyond the pipe frame, and the bracket is disposed in a position on an outer surface of the side frame, such that it substantially covers a front half of the pipe frame as viewed from a lateral direction, and protrudes frontward from the pipe frame.

According to this technique, the bracket is shaped like a box having front, rear, upper and lower sides all of which are flat, and a side collision load imposed on the bracket from outside in a lateral direction is transmitted through these flat sides to the side frame and through the side frame and the pipe frame to a side laterally opposite to that on which the bracket is disposed.

A vehicle seat comprising a seat back frame made of a pipe member shaped like a rectangular frame, a reinforcing member fixed in a position tilted from an upper portion of a laterally outer side of the frame to a lower portion of a laterally inner side of the frame has hitherto been known in the art (see Patent Literature 2). The reinforcing member has outer ends protruding from the frame, and end portions provided with flanges.

In this vehicle seat, as well, a side collision load imposed on one flange from a laterally outer side is transmitted through the reinforcing member and the other flange to a side laterally opposite to a side on which the one flange is provided.

CITATION LIST

Patent Literature

Patent Literature 1:JP 2000-103275 A
Patent Literature 2:JP 11-222088 A

However, with the technique disclosed in Patent Literature 1,the bracket is fixed to the side frame protruding frontward and rearward beyond the pipe frame, and there would thus be a risk of deformation of the side frame which would appear depending upon an angle or a magnitude of the load received from another member. As will be expected, particularly, in a case where the pipe frame is cylindrical, the side frame would become more likely to deform along this cylindrical surface.

Furthermore, since the sides of the bracket for transmitting a side collision load are flat, these flat sides of bracket, if their wall thickness is thin, would be buckled upon receipt of a side collision load, and could not properly receive the load; therefore, there is a risk that the load could not properly be transmitted to the side frame and the like.

Accordingly, it would be desirable to provide a vehicle seat in which deformation of a side frame caused by a load imposed from another member to a force-receiving member can be suppressed, and even if the wall thickness of the bracket (force-receiving member) is thin, the load can be received properly by the bracket.

Moreover, in the technique disclosed in Patent Literature 2,depending on the direction from which a load is received, the flange (force-receiving member) would possibly become deformed by the load; therefore, there is a risk that the load from another member could not be received properly.

It would thus be desirable to provide a vehicle seat in which a load from another member can properly be received by a force-receiving member.

SUMMARY OF INVENTION

A vehicle seat according to one aspect of the present invention comprises: left and right side frames which constitute left and right portions of a seat back frame; a reinforcing frame disposed adjacent to one side frame in a lateral direction, and configured to reinforce the side frame; and a force-receiving member disposed adjacent to the one side frame, provided discretely from the reinforcing frame, and configured to receive a load from another member. The force-receiving member is disposed opposite to the reinforcing frame with the side frame disposed therebetween, and directly fixed to the reinforcing frame.

With this configuration, the force-receiving member is not fixed through the side frame but fixed directly to the reinforcing frame, and thus irrespective of the angle and magnitude of the load imposed from another member on the force-receiving member, deformation of the side frame can be suppressed.

In the above configuration, the force-receiving member and the reinforcing frame may be fixed together through an opening formed in the side frame.

With this feature, the need, for example, to divide the side frame into front and rear parts or upper and lower parts so as to detour around a position in which the force-receiving member and the inner frame are fixed together can be obviated, and thus the rigidity of the side frame can be enhanced.

The force-receiving member may include an extension portion provided at a laterally inner side of the force-receiving member and extending through the opening to the reinforcing frame, and the extension portion may be fixed to the reinforcing frame.

With this feature, the opening may be formed so that not an entire region but part of the side of the force-receiving member is detoured around; therefore, the opening can be designed to be smaller, so that the rigidity of the side frame can be further enhanced.

The opening may preferably but not necessarily be a through hole.

With this feature, the rigidity of the side frame can be further enhanced, in comparison with a configuration in which the opening is shaped as a groove (or a hollow) that opens to the front or to the rear, because an upper portion and a lower portion of the side frame above to and below the position in which the force-receiving member and the reinforcing frame are fixed together can be connected at the front and rear sides of that position (through hole).

The reinforcing frame may be configured such that at least a portion thereof to which the force-receiving member is fixed has a shape with a closed section.

With this feature, the load received by the force-receiving member can be received by the closed-section-shaped reinforcing frame, and thus deformation of the reinforcing frame can be suppressed.

The force-receiving member may be configured to be fixed directly to both of the side frame and the reinforcing frame.

With this feature, the load imposed from another member on the force-receiving member can be received not only by the reinforcing frame but also by the side frame, and thus a greater load can be received.

The reinforcing frame may be configured such that a center in a front-rear direction thereof is located within a width in the front-rear direction of the force-receiving member.

With this feature, upon receipt of collision from another member, the load can be received more reliably by the reinforcing frame.

The force-receiving member may be fixed to a portion at a center of the reinforcing frame in a front-rear direction of the reinforcing frame.

With this feature, the load from the force-receiving member is transmitted intensively to the center in the front-rear direction of the reinforcing frame, and thus the load can be received more reliably.

The force-receiving member may be configured to include a front wall and a rear wall and has a shape with a closed cross section, such that a portion of at least one of the front wall and the rear wall separate from upper and lower ends thereof provides an uneven shape.

With this configuration, since at least one of the front and rear walls of the force-receiving member has a portion separate from the upper and lower ends thereof which portion has an uneven shape, the rigidity of that portion of the wall(s) having the uneven shape is thus increased, so that the wall(s) can be prevented from being buckled even if the wall thickness of the force-receiving member is thin; therefore, the load can be received reliably by the force-receiving member. In addition, since the uneven shape is not provided on the upper and lower ends of the front wall and the rear wall, the upper end and lower end corners of the front wall and the rear wall can be formed continuously in the lateral direction, so that these continuous corners can reliably transmit the load from one side to the other side in the lateral direction.

In the above configuration, the uneven shape may be formed in at least one of a laterally outer end and a laterally inner end of the at least one of the front wall and the rear wall, whereby an edge of the one end is bent frontward and rearward.

With this feature, the edge at a side (one side in the lateral direction) from which a load is received from another member, or the edge at a side (the other side in the lateral direction) from which the load is outputted is bent frontward and rearward, and thus the rigidity of that edge is increased, so that the load from another member can be received or outputted in a reliable manner The uneven shape may be formed in both of the front wall and the rear wall, as recessed portions that are recessed inwardly in a front-rear direction, wherein bottom walls of the recessed portions adjoin to each other.

With this feature, since the recessed portions are formed in the both of the front wall and the rear wall while a thicker portion formed by the bottom walls of the recessed portions adjoining to each other is disposed within a width in the front-rear direction of the force-receiving member, the rigidity of the front and rear walls of the force-receiving member and the rigidity of the inside of the force-receiving member can be increased, so that a load can be transmitted more reliably.

Each of the bottom walls may be located within a width in the front-rear direction of the reinforcing frame.

With this feature, since the bottom walls are located within the width in the front-rear direction of the reinforcing frame, a load transmitted to each bottom wall can be transmitted efficiently to the reinforcing frame.

Furthermore, according to the present invention, a center in the front-rear direction of the reinforcing frame may preferably be located within a total width in the front-rear direction of the adjoined bottom walls.

With this feature, the load transmitted to each bottom wall can be transmitted intensively and efficiently to and around the center of the reinforcing frame.

The force-receiving member described above may have a shape with a closed cross section, and has an input-side end portion and an output-side end portion, such that the input-side end portion stretches out in at least one of upward, downward, frontward and rearward directions wider than the output-side end portion.

With this configuration, since the force-receiving member has a shape with a closed section and the input-side end portion stretches out in at least one of upward, downward, frontward and rearward directions wider than the output-side end portion, the input-side end portion can be configured to have a double-wall structure in the direction from which a load is received. Accordingly, the rigidity of the force-receiving member can be increased, and thus deformation of the force-receiving member can be suppressed, so that the load from another member can be received reliably by the force-receiving member.

This configuration may be modified such that a width in a front-rear direction of a lower end portion of the input-side end portion is greater than that of an upper end portion of the input-side end portion.

This modification ensures a sufficient area for receiving the load, so that the force-receiving member can receive the load from another member with increased reliability.

Moreover, the reinforcing frame may be shaped like a pipe, and the output-side end portion of the force-receiving member may be located within a width in a front-rear direction of the reinforcing frame.

With this feature, the load received can be concentrated on the reinforcing frame, and thus the load received by the force-receiving member can be transmitted properly to the reinforcing frame.

The force-receiving member may be configured to include front and rear walls of which at least a portion has an oblique surface angled relative to a lateral direction such that a width in a front-rear direction of the force-receiving member is gradually made smaller.

With this feature, concentration of a stress (as imparted upon receipt of a load) on a part of the force-receiving member is suppressed, and thus deformation of the force-receiving member can be suppressed, so that the load from another member can be received with increased reliability.

The force-receiving member may be configured to include upper and lower walls of which at least a portion has an oblique surface angled relative to a lateral direction such that a width in an upward-and-downward direction of the force-receiving member is gradually made smaller.

With this feature, concentration of a stress (as imparted upon receipt of a load) on a part of the force-receiving member is suppressed, and thus deformation of the force-receiving member can be suppressed, so that the load from another member can be received with increased reliability.

The force-receiving member may be configured to include an upper wall and a lower wall and has a shape with a closed cross section, and a portion of at least one of the upper wall and the lower wall separate from front and rear ends thereof provides an uneven shape.

With this configuration, since at least one of the upper and lower walls of the force-receiving member has a portion separate from the front and rear ends thereof which portion has an uneven shape, the rigidity of that portion of the wall(s) having the uneven shape is thus increased, so that the wall(s) can be prevented from being buckled even if the wall thickness of the force-receiving member is thin; therefore, the load can be received by the force-receiving member with reliability. In addition, since the uneven shape is not provided on the front and rear ends of the upper wall and the lower wall, the front end and rear end corners of the upper wall and the lower wall can be formed continuously in the lateral direction, so that these continuous corners can effectively transmit the load from one side to the other in the lateral direction.

In the above-described configuration, the uneven shape formed in the at least one of the upper wall and the lower wall may be of a stepped profile formed by overlapping two plate-like portions.

With this feature, since the overlapped portion of the two plate-like portions is rendered thicker, the rigidity can be enhanced.

The stepped profile may be continuously formed from the at least one of the upper wall and the lower wall to an outer wall of the force-receiving member located at a side laterally opposite to that on which the reinforcing frame is provided.

Moreover, the stepped profile may be continuously formed from the at least one of the upper wall and the lower wall to an outer wall located at a laterally outer side of the force-receiving member.

With this feature, since the thicker portion is continuously formed from the outer wall to the upper wall or the lower wall, a load received at the outer wall can be transmitted reliably to the upper wall or the lower wall.

The force-receiving member may be segmented in front and rear halves of box-like members which are fitted together, and configured such that the stepped profile is formed as a result of fitting the box-like members together, continuously across the upper wall, the outer wall and the lower wall.

With this feature, since the thicker portion of the outer wall extends continuously to the upper wall and the lower wall, a load received at the outer wall can be transmitted reliably through the upper wall and the lower wall in a laterally inward direction.

BRIEF DESCRIPTION OF DRAWINGS

FIG. 3 shows (a) section I-I, (b) section II-II, and (c) section III-III of FIG. 2.

FIG. 8 includes (a) a perspective view showing an embodiment having a stepped profile formed only on an upper wall, and (b) a perspective view showing an embodiment having a stepped profile formed continuously only on the upper wall and an outer wall.

MODE(S) FOR CARRYING OUT THE INVENTION

Hereafter, a description will be given of one embodiment (first embodiment) of the present invention with reference to the drawings.

Figure 1:
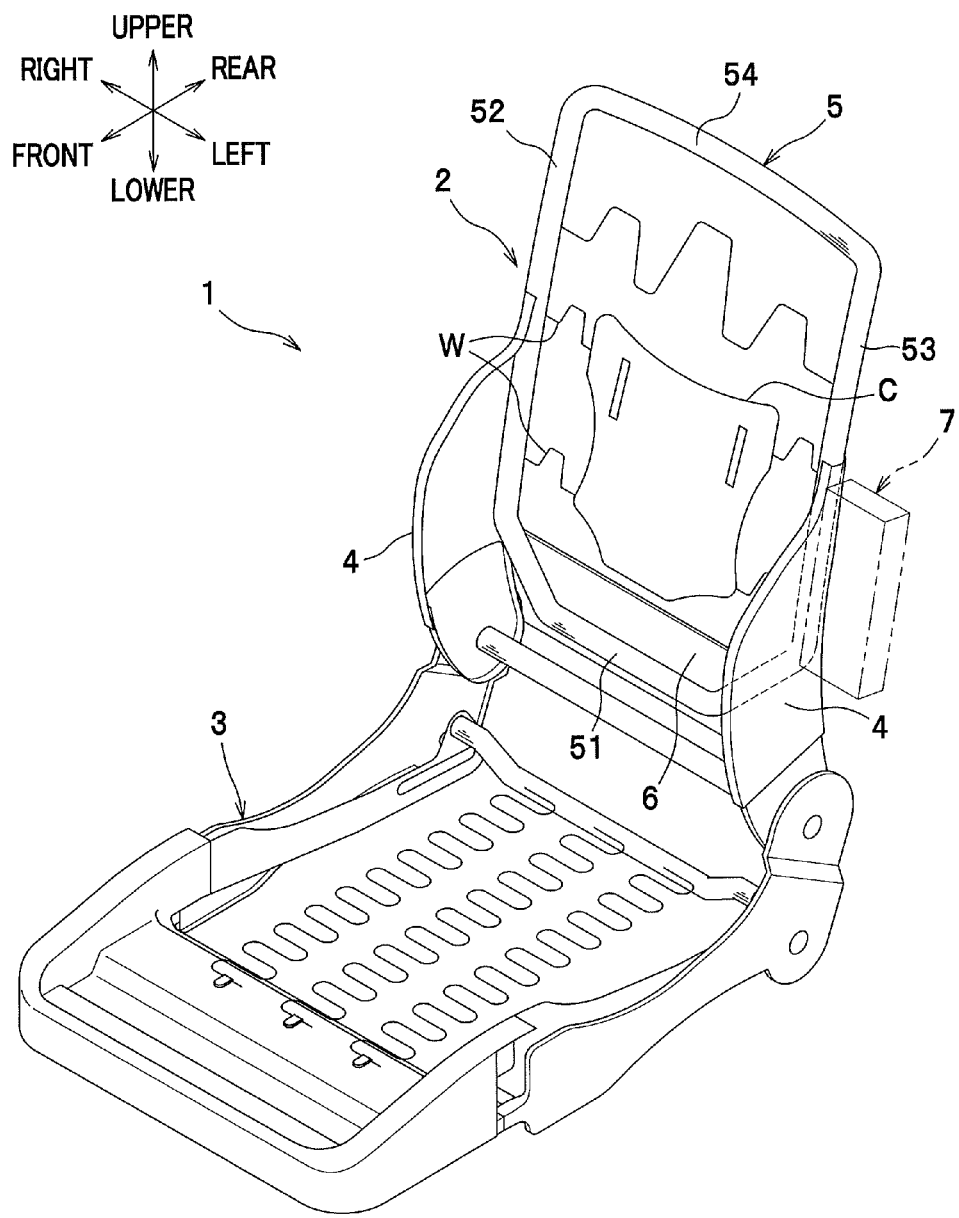
FIG. 1 is a perspective view of a vehicle seat according to one embodiment of the present invention.

A vehicle seat according to the present embodiment is made up of a seat frame 1 as shown in FIG. 1 the outside of which is covered with a seat cushion made of urethane foam or the like. The seat frame 1 includes a seat back frame 2 and a seat bottom frame 3. It is to be understood that in describing the present invention, the front/rear, left/right and upper/lower are defined as viewed from an occupant sitting on the seat.

The seat back frame 2 is configured to include a pair of side frames 4, a pipe frame 5 as one example of a reinforcing frame (inner frame) for reinforcing the side frames 4, a lower frame 6, and a bracket 7 as one example of a force-receiving member.

Figure 2:
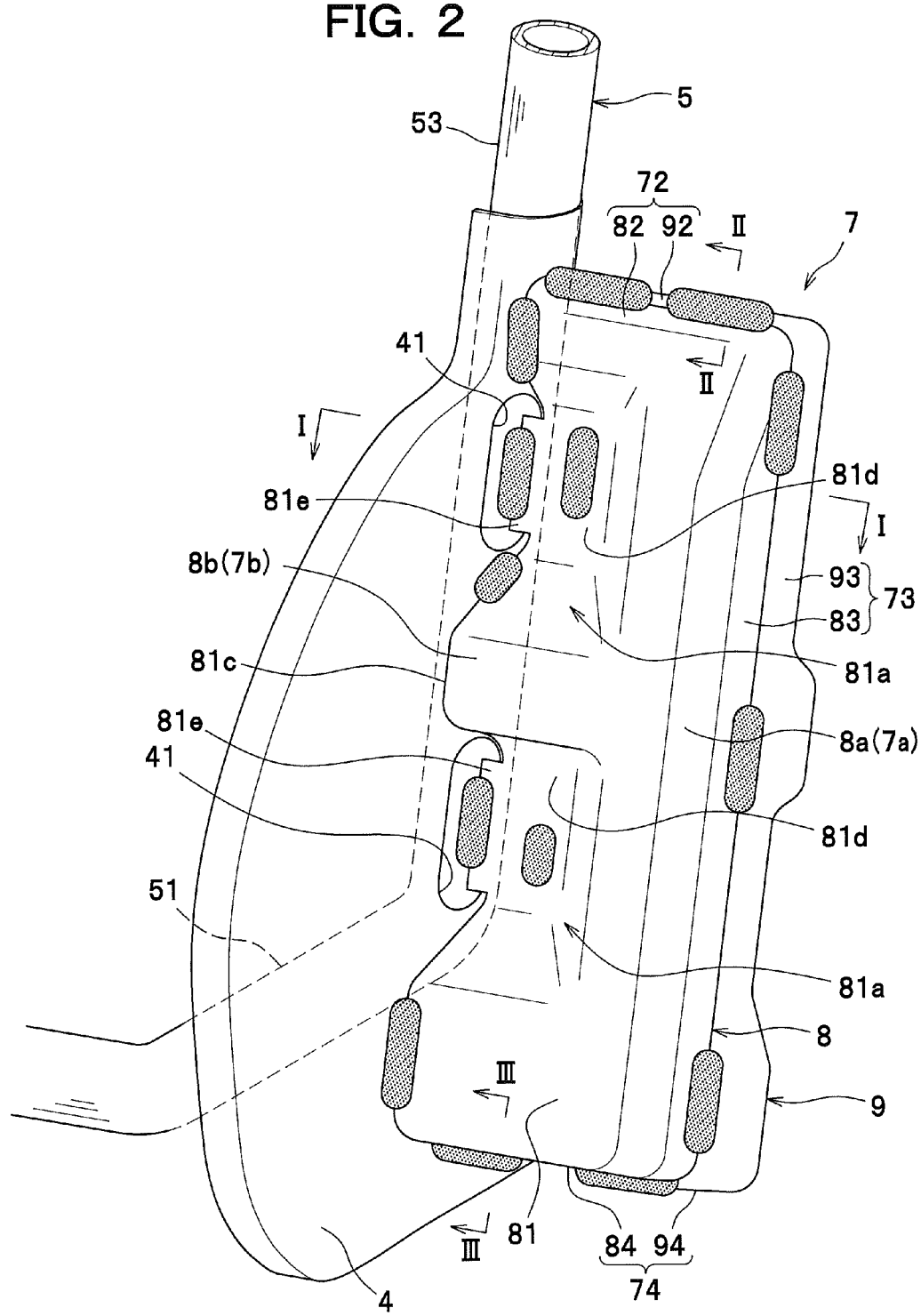
FIG. 2 is an enlarged perspective view of a bracket and its surrounding structure as viewed from the front.

The side frames 4 are plate-like members which constitute left and right lower portions of the seat back frame 2, and each configured to protrude frontward (in at least one of the front and rear directions) beyond the pipe frame 5, as shown in FIG. 2. This configuration provides a frontwardly overhanging shape formed at each side of the seat back, and allows an air bag or other parts (not shown) to be securely fixed to the frontwardly and rearwardly extending plate-like side frames 4.

To be more specific, as shown in FIG. 3(a), each side frame 4 has a through hole 41 pierced through the left and right sides at an appropriate position thereof, and a front portion 42 thereof is bent inwardly to the left or to the right and further bent to the rear to form a U-shaped cross section. This configuration serves to improve the rigidity of the front portion 42 of the side frame 4.

A rear portion 43 of each side frame 4 is bent inwardly to the left or to the right to form an L-shaped cross section, and is joined to the pipe frame 5 by welding. In FIG. 3(a), welds or spots welded by a welding torch T are illustrated with exaggerated black dots.

As shown in FIG. 1, the pipe frame 5 is a reinforcing member for reinforcing side frames 4, having a cylindrical shape (with a closed section), which is bent into a shape of a substantially rectangular loop. This pipe frame 5 includes side portions 52, 53 disposed adjacent to the inner sides of the side frames 4, a lower portion 51 connecting lower ends of the side portions 52, 53, and an upper portion 54 connecting upper ends of the side portions 52, 53. Lower portions of the left and right side portions 52, 53 of the pipe frame 5 are joined to laterally inner sides of the side frames 4, respectively. With this configuration, the lower portion 51 (including portions extending obliquely downward from the portions adjacent to the side frames 4) of the pipe frame 5 is configured to serve, in combination with the lower frame 6, as a load transmission part, to transmit a load to the left or to the right.

Two wires W bent to ascend and descend several times are provided in positions spaced out vertically, and joined to left and right side portions 52, 53 of the pipe frame 5, and a pressure-receiving member C shaped like a plate and made of plastic is fixed to these wires W. With this configuration, when the vehicle receives a rear-end collision load, the occupant subsides rearward together with the pressure-receiving member C inside the pipe frame 5, and thus the impact of the rear-end collision load against the occupant can be softened.

The lower frame 6 is a plate-like member extending laterally, which is joined to the lower portions of the side frames 4 and to the lower portion 51 of the pipe frame 5. With this configuration, a load imposed on the bracket 7 from outside in the left or right direction is transmitted through the lower frame 6 and the aforementioned lower portion 51 of the pipe frame 5 to the side laterally opposite to that on which the bracket 7 is provided.

The bracket 7 is a part provided discretely from the pipe frame 5 and the side frames 4, and disposed adjacent, and joined, to the left side (laterally outer side) of the left side frame 4 (one of the side frames). To be more specific, the bracket 7 is configured such that an input-side end portion 7a thereof located at a laterally outer side (outer wall 73 (see FIG. 2)) when the vehicle seat is installed in the vehicle is disposed near a side panel (another member) such as a side pillar or a door of the vehicle, so that a side collision load imposed on the vehicle from the input-side end portion 7a is received through the side panel. In the bracket 7, a load received from the input-side end portion 7a is outputted (transmitted) from an output-side end portion 7b located at a laterally inner side thereof to the side frame 4 and the pipe frame 5.

The bracket 7 is, as shown in FIG. 2, directly fixed by welding to the pipe frame 5 through two through holes 41 as one example of an opening formed in the side frame 4. With this configuration, irrespective of the angle and magnitude of the side collision load received, the load can be transmitted properly from the bracket 7 to the pipe frame 5 without getting affected by deformation of the side frame 4. In the drawings, the welded spots are illustrated with shades of dots.

To be more specific, the bracket 7 is segmented in front and rear halves of a front-side box-like member 8 and a rear-side box-like member 9 which are fitted together, and configured such that the box-like members 8, 9, once combined together, form a closed section as taken along a plane perpendicular to the lateral direction.

The front-side box-like member 8 includes a plate-like front wall 81 elongated in the upward-and-downward direction longer than extending in the lateral direction, an upper wall 82 extending from an upper end of the front wall 81 rearward, an outer wall 83 extending from a laterally outer end of the front wall 81 rearward, and a lower wall 84 extending from a lower end of the front wall 81 rearward, all of which are provided integrally. In other words, the front-side box-like member 8 is configured to have a shape of a box which opens to the rear and to a laterally inner side.

In the front wall 81, two recessed portions 81a (providing an uneven shape) disposed in a portion separate from upper and lower ends of the front wall 81 and configured to be recessed inwardly in the front-rear direction are arranged in positions spaced out vertically at a predetermined distance. With this configuration, the rigidity of the front wall 81 is enhanced, and thus a side collision load can be transmitted effectively to the pipe frame 5 by the high-rigidity front wall 81. Moreover, since the recessed portions 81a are formed in the portion of the front wall 81 separate from the upper and lower ends thereof, the upper and lower end corners of the front wall 81 can be formed continuously in the left-right direction, so that the continuous corners can effectively transmit the load from outside to inside in the lateral direction.

Each recessed portion 81a is formed at a laterally inner end portion (output-side end portion) 8b of the front wall 81, and thus opens to the front and to the laterally inner side. With this configuration, an edge 81c of the output-side end portion 8b is bent to the front and to the rear, and thus the rigidity of the edge 81c located at an output side of the side collision load can be increased, so that the side collision load can effectively be transmitted to the pipe frame 5 or the like.

As shown in FIG. 3(a), each recessed portion 81a (see FIG. 2) has a bottom wall 81d and a left inner wall 81g extending in an obliquely rightward-and-rearward direction from the front side of the input-side end portion 8a of the front wall 81 toward the bottom wall 81d of the recessed portion 81a. In other words, the front wall 81 has an oblique surface (inner wall 81g) angled relative to the lateral direction such that a width in the front-rear direction of the bracket 7 is gradually made smaller toward a left-to-right direction. With this feature, concentration of a stress, as imparted upon receipt of a load, on a part of the front wall 81 is suppressed, and thus deformation of the bracket 7 can be suppressed, so that the load can be transmitted properly.

At the bottom wall 81d of each recessed portion 81a, an extension portion 81e (part of the force-receiving member provided at a laterally inner side thereof) extending laterally inward beyond the edge 81c of the front wall 81 is formed. This extension portion 81e is disposed inside the through hole 41 of the side frame 4 described above, and extends to the pipe frame 5, so that the extension portion 81e abutting on the pipe frame 5 is welded to the pipe frame 5.

Since only the extension portion 81e is passed through the through hole 41, the through hole 41 may be sized to conform to the extension portion 81e, and thus the through hole 41 may be made smaller so that the rigidity of the side frame 4 can be enhanced. To be more specific, in the present embodiment, the through hole 41 is shaped like an elongate hole having dimensions smaller than the width of the pipe frame 5 in a front-rear direction, and smaller than the whole length of the edge 81c of the front wall 81 and greater than the extension portion 81e in a vertical direction.

The size of the through hole 41 may be designed to have, at the largest, an area comparable or smaller than a cross-sectional area of a laterally inner end portion (adjacent an end located at a side from which the side collision load is outputted) of the bracket 7. The through hole 41 formed to have a size described above makes it possible to impart a higher rigidity of the side frame 4, for example, in comparison with a through hole formed in the side frame to have such a size as to allow the laterally inner end portion of the bracket 7 to be passed through in its entirety.

Although the extension portion 81e is provided in the present embodiment, the present invention is not limited to this configuration; i.e., a configuration without the extension portion 81e may also be possible. In this configuration, some gap may be left between the pipe frame 5 and the edge 81c of the front wall 81, but this gap still permits welding by which the pipe frame 5 and the bracket can be joined directly.

As shown in FIGS. 2, 3(a), a portion (including the extension portion 81e) of the edge 81c of the output-side end portion 8b which defines the edge of the bottom wall 81d of the recessed portion 81a is located within the width in the front-rear direction of the pipe frame 5. Of this portion, the extension portion 81e is fixed to a central portion 5a located at a center in the front-rear direction of the pipe frame 5. With this configuration, the load from the bracket 7 is transmitted intensively to the central portion 5a of the pipe frame 5, and thus the load can be transmitted more effectively.

A center 5b in the front-rear direction of the pipe frame 5 is located within a width in the front-rear direction of the bracket 7. With this configuration, upon side collision, the load can be transmitted more effectively because the bracket 7 can be prevented from slipping out to the front or to the rear on a cylindrical outer surface of the pipe frame 5.

As shown in FIG. 2, an upper portion and a lower portion of the edge 81c of the front wall 81 are fixed to the side frame 4 by welding. In other words, the front wall 81 is fixed directly to both of the side frame 4 and the pipe frame 5. With this configuration, the load received by the bracket 7 is transmitted not only through the pipe frame 5 but also through the side frame 4 to the load transmission part (the lower frame 6 and the lower portion 51 of the pipe frame 5), and thus more effective transmission of the load can be ensured. It is appreciated that the load transmitted to the load transmission part can be transmitted to the vehicle body side through a console box or the like provided at a side opposite to that on which the bracket 7 is provided.

Figure 4:
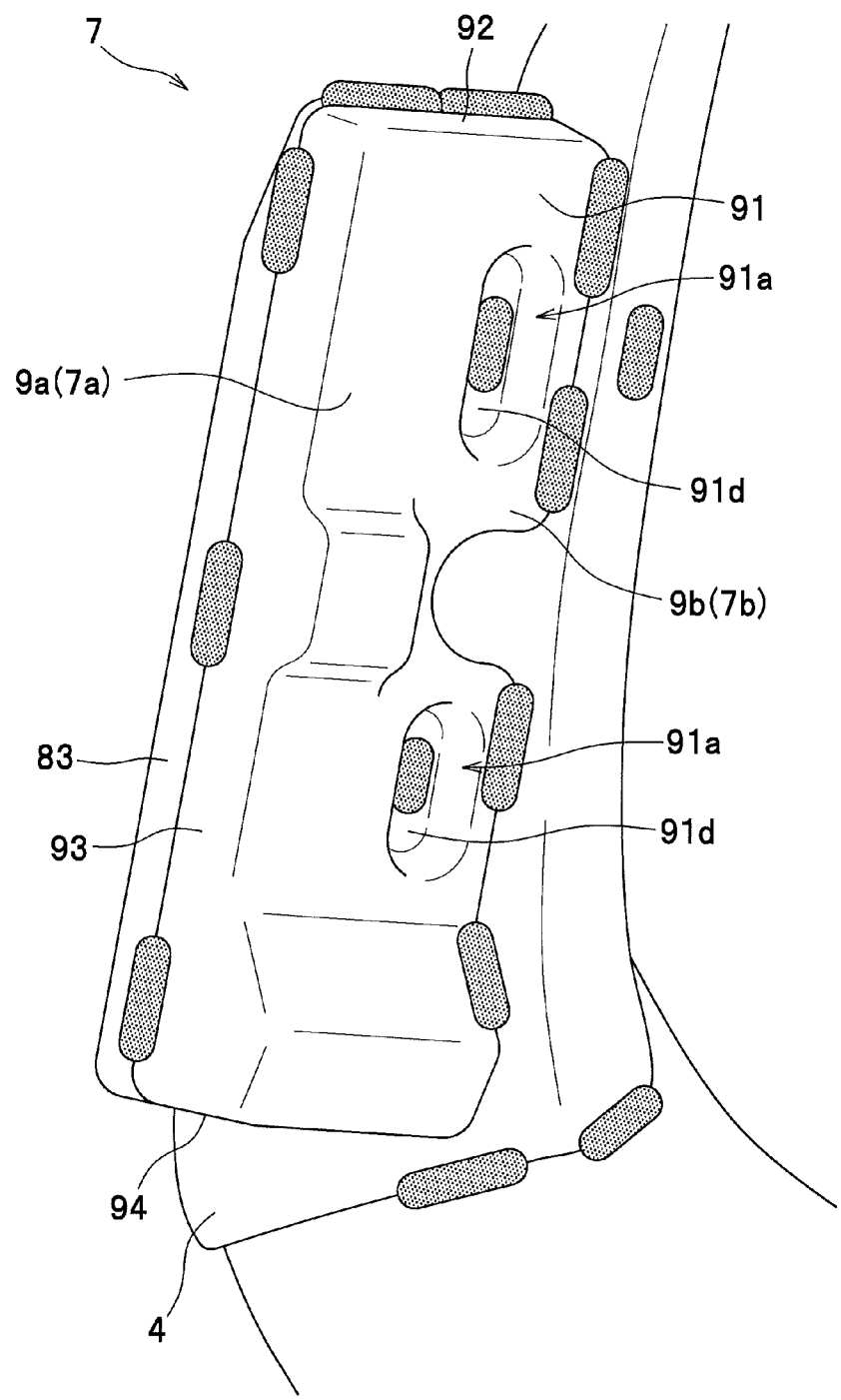
FIG. 4 is an enlarged perspective view of the bracket and its surrounding structure as viewed from the rear.

As shown in FIG. 4, the rear-side box-like member 9 includes a plate-like rear wall 91 elongated in the upward-and-downward direction longer than extending in the lateral direction, an upper wall 92 extending from an upper end of the rear wall 91 frontward, an outer wall 93 extending from a laterally outer end of the rear wall 91 frontward, and a lower wall 94 extending from a lower end of the rear wall 91 frontward, all of which are provided integrally. In short, the rear-side box-like member 9 is configured to have a shape of a box which opens to the front and to the laterally inner side.

In the rear wall 91, two recessed portions 91a (providing an uneven shape) disposed in a portion separate from upper and lower ends of the rear wall 91 and configured to be recessed inwardly in the front-rear direction are arranged in positions spaced out vertically at a predetermined distance. With this configuration, the rigidity of the rear wall 91 is enhanced, and thus a side collision load can be transmitted effectively to the laterally inner side by the high-rigidity rear wall 91. Moreover, since the recessed portions 91a are formed in the portion of the rear wall 91 separate from the upper and lower ends thereof, the front and rear end corners of the rear wall 91 can be formed continuously in the left-right direction, so that the continuous corners can effectively transmit the load from outside to inside in the lateral direction.

As shown in FIG. 3(a), each recessed portion 91a has a bottom wall 91d and a left inner wall 91g extending in an obliquely rightward-and-frontward direction from the rear side of the input-side end portion 9a of the rear wall 91 toward the bottom wall 91d. In other words, the rear wall 91 has an oblique surface (inner wall 91g) angled relative to the lateral direction such that a width in the front-rear direction of the bracket 7 is gradually made smaller toward a left-to-right direction. With this feature, concentration of a stress, as imparted upon receipt of a load, on a part of the rear wall 91 is suppressed, and thus deformation of the bracket 7 can be suppressed, so that the load can be received reliably. Moreover, the load can be transmitted properly.

Each recessed portion 91a is disposed opposite to a corresponding recessed portion 81a of the front-side box-like member 8 in the front-rear direction, whereas each bottom wall 91d and a bottom wall 81d of a corresponding recessed portion 81a are disposed to adjoin to each other, as shown in FIG. 3(a). With this configuration, the two bottom walls 81d, 91d adjoining to each other constitute a thick portion located substantially at the center in the front-rear direction of the bracket 7, and thus effective transmission of the side collision load can be achieved.

The two bottom walls 81d, 91d adjoining to each other are joined together by welding. With this configuration, the rigidity of the bracket 7 can be enhanced, and thus effective transmission of the side collision load can be achieved.

The two bottom walls 81d, 91d adjoining to each other are located within a width in the front-rear direction of the pipe frame 5. With this feature, the side collision load can be effectively transmitted to the pipe frame 5 through the thick portion made up of the adjoining bottom walls 81d, 91d.

Furthermore, the center 5b in the front-rear direction of the pipe frame 5 is located within a width in the front-rear direction of the thick portion made up of the adjoining bottom walls 81d, 91d. With this configuration, the load can be transmitted intensively to the center 5b or thereabound of the pipe frame 5 through the thick portion made up of the adjoining bottom walls 81d, 91d.

An edge 91c of the output-side end portion 9b in an upper portion (extending from the lower recessed portion 91a above) of the rear wall 91 is located within the width in the front-rear direction of the pipe frame 5. With this configuration, the output-side end portion 9b, specifically the edge 91c and the edge 81c (defining the edge of the bottom wall 81d) of the front wall 81 is located within the width of the pipe frame 5 (reinforcing frame) in the front-rear direction. As a result, the load received is transmitted intensively to the pipe frame 5, and thus the load can be transmitted properly.

As shown in FIG. 4, a laterally inner end portion (output-side end portion) 9b of the rear wall 91 is fixed to the side frame 4 by welding. To be more specific, as shown in FIG. 3(a), the output-side end portion 9b, located laterally inner end of the rear wall 91 is joined to a closed-section-shaped portion made up of a rear portion 43, bent into an L-shape, of the side frame 4 and a left-side rear portion of the pipe frame 5. With this configuration, the side collision load transmitted from the rear wall 91 to a laterally inner side is received properly by the closed-section-shaped portion, and thus can be transmitted effectively to the pipe frame 5.

Furthermore, as shown in FIGS. 2, 3, the upper wall 92, outer wall 93 and lower wall 94 of the rear-side box-like member 9 is disposed over the upper wall 82, outer wall 83 and lower wall 84 of the front-side box-like member 8, and fixed to the walls 82-84, respectively by welding.

With this configuration, as shown in FIG. 3(b), the upper wall 72 of the bracket 7 has a stepped profile 72a (providing an uneven shape) formed, at a position separate from the front and rear ends thereof, by overlapping the upper walls 82, 92 (two plate-like portions) of the respective box-like members 8, 9. With this configuration, a portion of the upper wall 72 substantially at the center thereof in the front-rear direction is formed as a thick portion by overlapping the upper walls 82, 92, and thus the rigidity of the upper wall 72 can be enhanced, so that a side collision load can be transmitted effectively.

Furthermore, since the stepped profile 72a (providing an uneven shape) is formed in a position separate from the front and rear ends of the upper wall 72, the front and rear end corners of the upper wall 72 can be formed continuously in the left-right direction, so that the continuous corners can effectively transmit the load from outside to inside in the lateral direction.

Similarly, as shown in FIGS. 3(a), (c), the outer wall 73 and lower wall 74 of the bracket 7 also have stepped profiles 73a, 74a formed by overlapping the outer walls 83, 93 and the lower walls 84, 94, respectively, of the box-like members 8, 9. With this configuration, the rigidities of the outer wall 73 and the lower wall 74 as well can be enhanced, and the front and rear end corners of the lower wall 74 can be formed continuously in the left-right direction, so that the continuous corners can effectively transmit the load from outside to inside in the lateral direction.

The stepped profiles 72a, 73a, 74a are formed continuously across the upper wall 72, outer wall 73 and lower wall 74 of the bracket 7 as a result of fitting the rear-side box-like member 9 on the front-side box-like member 8. With this configuration, the thick portion of the outer wall 73 is formed continuously to the thick portions of the upper wall 72 and the lower wall 74, and thus a side collision load received by the thick portion of the outer wall 73 can be transmitted effectively to the laterally inner side through the upper and lower continuous thick portions.

Advantageous effects of the vehicle seat according to the present embodiment as described above are summarized hereinafter.

Since the bracket 7 is not fixed through the side frame 4 but fixed directly to the pipe frame 5, the side collision load received, irrespective of its angle and magnitude, can be transmitted properly from the bracket 7 to the pipe frame 5 without getting affected by deformation of the side frame 4.

Since the bracket 7 is provided discretely from the pipe frame 5, each member can be formed into any shape freely, and can be made easy to assemble.

Since the bracket 7 and the pipe frame 5 are fixed together through an opening (through hole 41) formed in the side frame 4, the need, for example, to divide the side frame 4 into front and rear parts or upper and lower parts so as to detour around a position in which the bracket and the pipe frame are fixed together can be obviated, and thus the rigidity of the side frame 4 can be enhanced.

Since only part (extension portion 81e) of the bracket 7 is fixed to the pipe frame 5 through the opening (through hole 41), the need to form an opening allowing an entire side portion at a laterally inner side of the bracket to pass therethrough in the side frame can be obviated, and thus the rigidity of the side frame 4 can be further enhanced.

Since the opening formed in the side frame 4 is configured as a through hole 41, the rigidity of the side frame 4 can be further enhanced, in comparison with a configuration in which the opening is shaped as a groove (or a hollow) that opens to the front or to the rear, because an upper portion and a lower portion of the side frame 4 above and below the position in which the bracket 7 and the pipe frame 5 are fixed together can be connected at the front and rear sides of that position.

Since the bracket 7 is fixed to a portion of the pipe frame 5 having a shape with a closed section, the load received by the bracket 7 can be transmitted properly to the load transmission part (the lower frame 6 and the lower portion 51 of the pipe frame 5) through the pipe frame 5 which can be resistant to deformation.

Since the bracket 7 is fixed directly to the both of the side frame 4 and the pipe frame 5, the load received by the bracket 7 is transmitted not only through the pipe frame 5 but also through the side frame 4 to the load transmission part, so that the load can be transmitted more effectively.

Since the center 5b of the pipe frame is located within the width in the front-rear direction of the bracket 7, the bracket 7 upon receipt of side collision load can be prevented from slipping out to the front or to the rear on a cylindrical outer surface of the pipe frame 5, so that the load can be transmitted more effectively.

Since the bracket 7 is fixed to the portion 5a located at a center in the front-rear direction of the pipe frame 5, the load from the bracket 7 can be transmitted intensively to the central portion 5a at the center in the front-rear direction of the pipe frame 5, so that the load can be transmitted more effectively.

Since the output-side end portion 7b of the bracket 7 is located within the width in the front-rear direction of the pipe frame 5, the load received can be concentrated on the pipe frame 5, so that the load received by the bracket 7 can be transmitted effectively to the pipe frame 5.

Since the front wall 81 and the rear wall 91 of the bracket 7 include oblique surfaces (inner walls 81g,91g) angled relative to the lateral direction such that the width in the front-rear direction of the bracket 7 is gradually made smaller, deformation of the bracket 7 can be suppressed, and thus the load can be transmitted more effectively.

Since a portion of the front wall 81 and the rear wall 91 of the bracket 7 separate from their upper and lower ends is configured to provide an uneven shape (recessed portions 81a, 91a), the rigidity of the walls 81, 91 is enhanced; therefore, even if the wall thickness of the bracket 7 is thin, the walls 81, 91 are prevented from being buckled, so that a load can be transmitted effectively from outside toward inside in the lateral direction. Enhanced rigidity by this uneven shape allows the bracket 7 to be made thinner in wall thickness, and the vehicle seat to be made lighter in weight.

Since the uneven shape is not provided at the upper and lower ends of the front wall 81 and the rear wall 91, the upper and lower end corners of the front wall 81 and the rear wall 91 can be formed continuously in the lateral direction; therefore, these continuous corners serve to transmit a load effectively from outside to inside in the lateral direction.

Since the edge 81c at the laterally inner side of the front wall 81 which is the side from which a side collision load is outputted is bent frontward and rearward, the rigidity of this edge 81c is enhanced, so that the side collision load can be effectively outputted.

Since the recessed portions 81a, 91a are formed in the both of the front wall 81 and the rear wall 91 whereas a thicker portion formed by the bottom walls 81d, 91d adjoining to each other is disposed within the width in the front-rear direction of the bracket 7, the rigidity of the front wall 81 and the rear wall 91 of the bracket 7 and the rigidity of the inside of the bracket 7 can be enhanced, so that a load can be transmitted more effectively.

Since the bottom walls 81d,91d are located within the width in the front-rear direction of the pipe frame 5, a load transmitted to each bottom wall 81d, 91d can be transmitted efficiently to the pipe frame 5.

Since the center 5b of the pipe frame 5 is located within the total width in the front-rear direction of the adjoining bottom walls 81d, 91d, a load transmitted to each bottom wall 81d, 91d can be transmitted intensively to and around the center of the pipe frame 5.

Since a portion of the upper wall 72 and the lower wall 74 of the bracket 7 separate from their front and rear ends is configured to provide an uneven shape (stepped profiles 72a, 74a), the rigidity of the walls 72, 74 is enhanced; therefore, even if the wall thickness of the bracket 7 is thin, the walls 72, 74 are prevented from being buckled, so that a load can be transmitted effectively from outside toward inside in the lateral direction. Enhanced rigidity by this uneven shape allows the bracket 7 to be made thinner in wall thickness, and the vehicle seat to be made lighter in weight.

Since the uneven shape is not provided at the front and rear ends of the upper wall 72 and the lower wall 74, the front and rear end corners of the upper wall 72 and the lower wall 74 can be formed continuously in the lateral direction; therefore, these continuous corners serve to transmit a load effectively from outside to inside in the lateral direction.

Since the uneven shape is made of the stepped profile (stepped profile 72a) provided by overlapping two walls (e.g., upper walls 82, 92), the overlapped portion of the two walls is rendered thicker, so that the rigidity can be enhanced.

Since the stepped profiles 72a, 73a, 74a are provided continuously across the walls 72-74, i.e., the thicker portion of the outer wall 73 extends continuously to the upper wall 72 and the lower wall 74, a load received at the outer wall 73 can be transmitted effectively through the upper wall 72 and the lower wall 74 in a laterally inward direction.

Hereinafter, a description will be given of another embodiment (second embodiment) of the present invention with reference made mainly to FIGS. 5-7. In the drawings which will be referred to in describing the second embodiment, substantially the same elements as those described in the first embodiment will be designated by the same reference numerals, and an explanation thereof will be omitted.

A vehicle seat according to the present embodiment is, as in the first embodiment, made up of a seat frame 1 the outside of which is covered with a seat cushion made of urethane foam or the like. The seat frame 1 includes a seat back frame 2 and a seat bottom frame 3, and the seat back frame 2 is configured to include a pair of side frames 4, a reinforcing frame for reinforcing the side frames 4, that is, a pipe frame 5, a lower frame 6, and a bracket 7 as one example of a force-receiving member (see FIG. 1).

The bracket 7 is, as in the first embodiment, configured such that a laterally outer input-side end portion 7a (outer wall 73 (see FIG. 5)) is disposed near a side panel (another member) such as a side pillar or a door of the vehicle when the vehicle seat is installed in the vehicle and that a side collision load imposed on the vehicle is received, through the side panel, from this input-side end portion 7a. Moreover, the bracket 7 is configured such that a load received from the input-side end portion 7a is outputted (transmitted) from a laterally inner output-side end portion 7b to the side frame 4 and the pipe frame 5.

Figure 6:
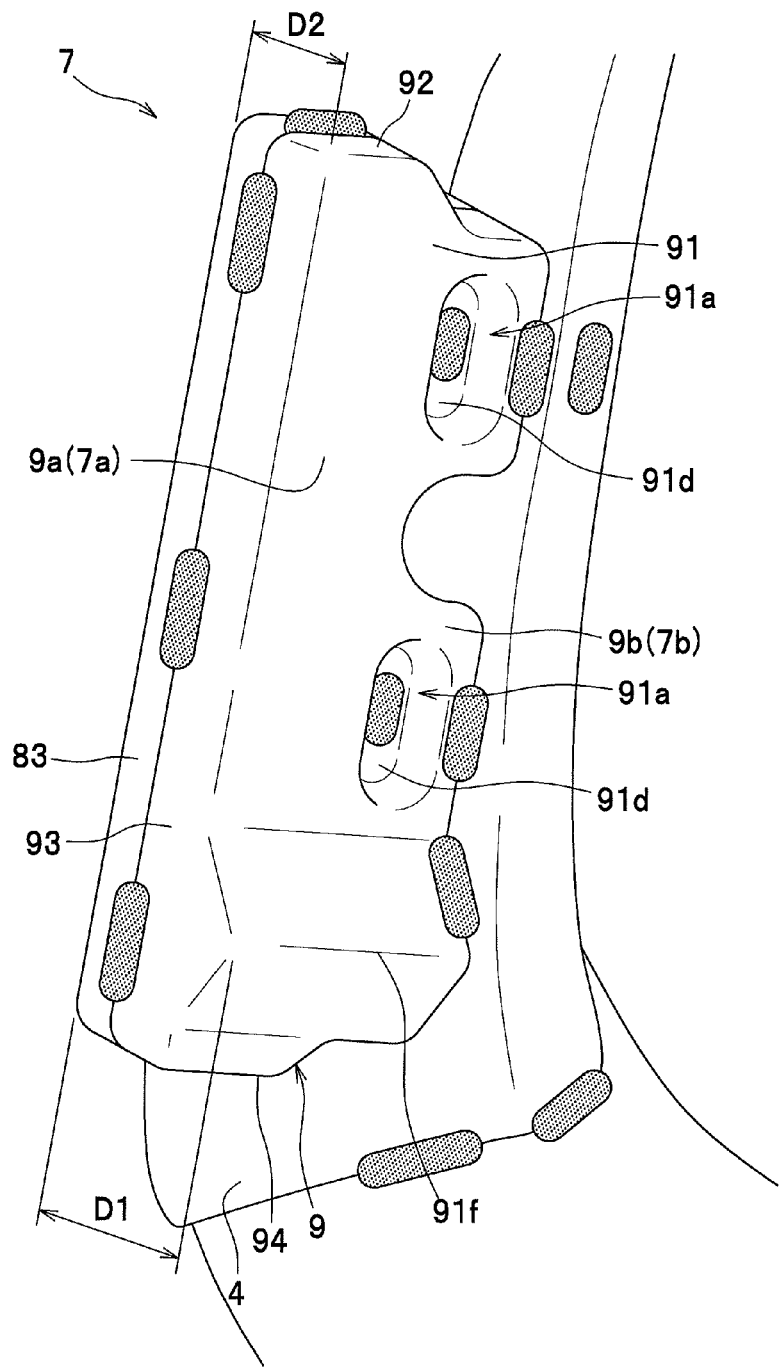
FIG. 6 is an enlarged perspective view of the bracket and its surrounding structure as viewed from the rear.
Figure 7:
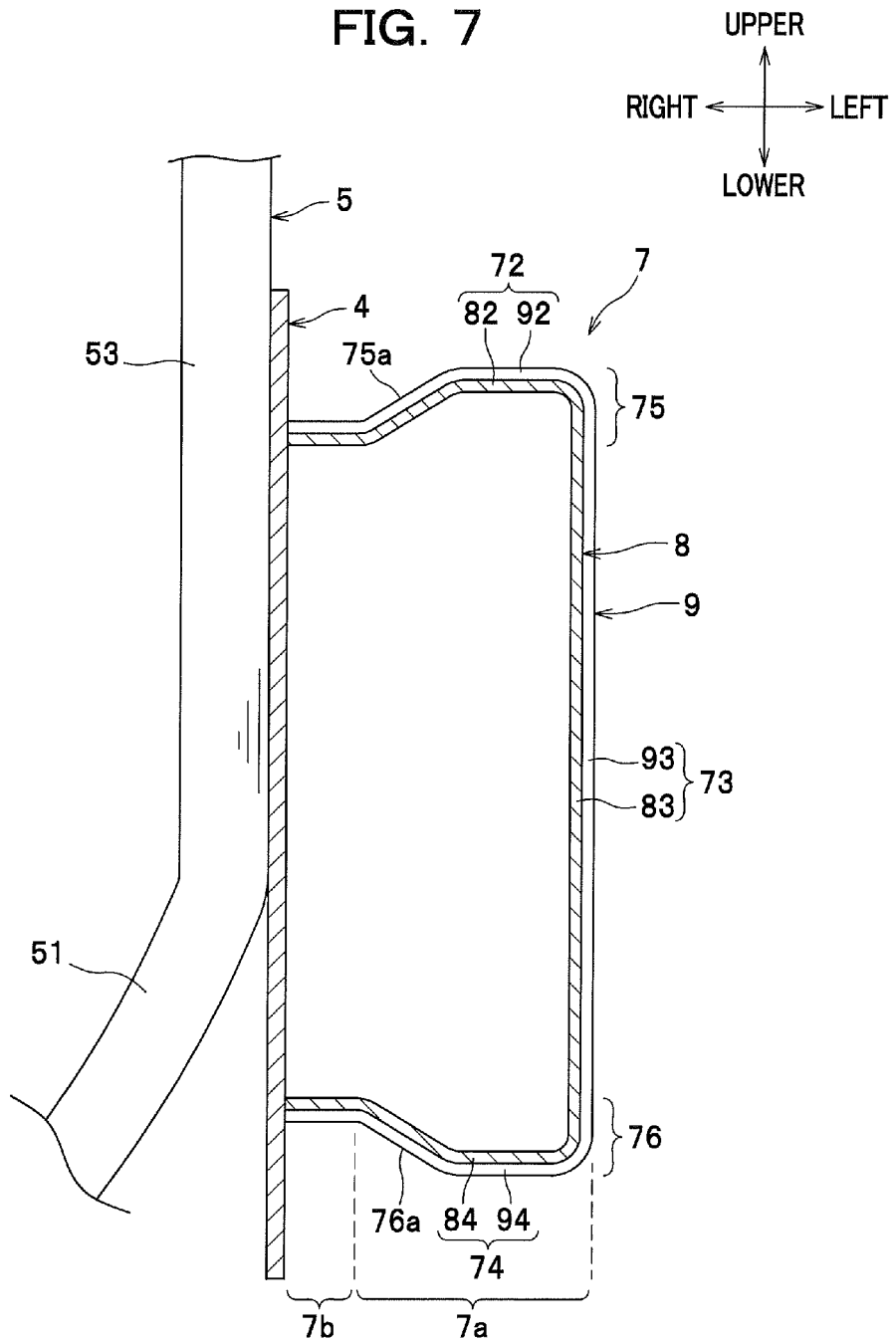
FIG. 7 is a sectional view of the bracket.

As shown in FIG. 6, the rear wall 91 has a lower end portion 91f formed to bulge rearward in a substantially ridge-like shape. With this configuration, the bracket 7 is made to have a width D1 in a front-rear direction of its lower end portion greater than a width D2 in the front-rear direction of its upper end portion. As a result, a sufficient area for receiving the load is provided, and the rigidity of the lower end portion, in which load transmission occurs principally, of the bracket 7 is increased, and thus the load can be received reliably. Moreover, the load can thus be transmitted effectively.

Figure 5:
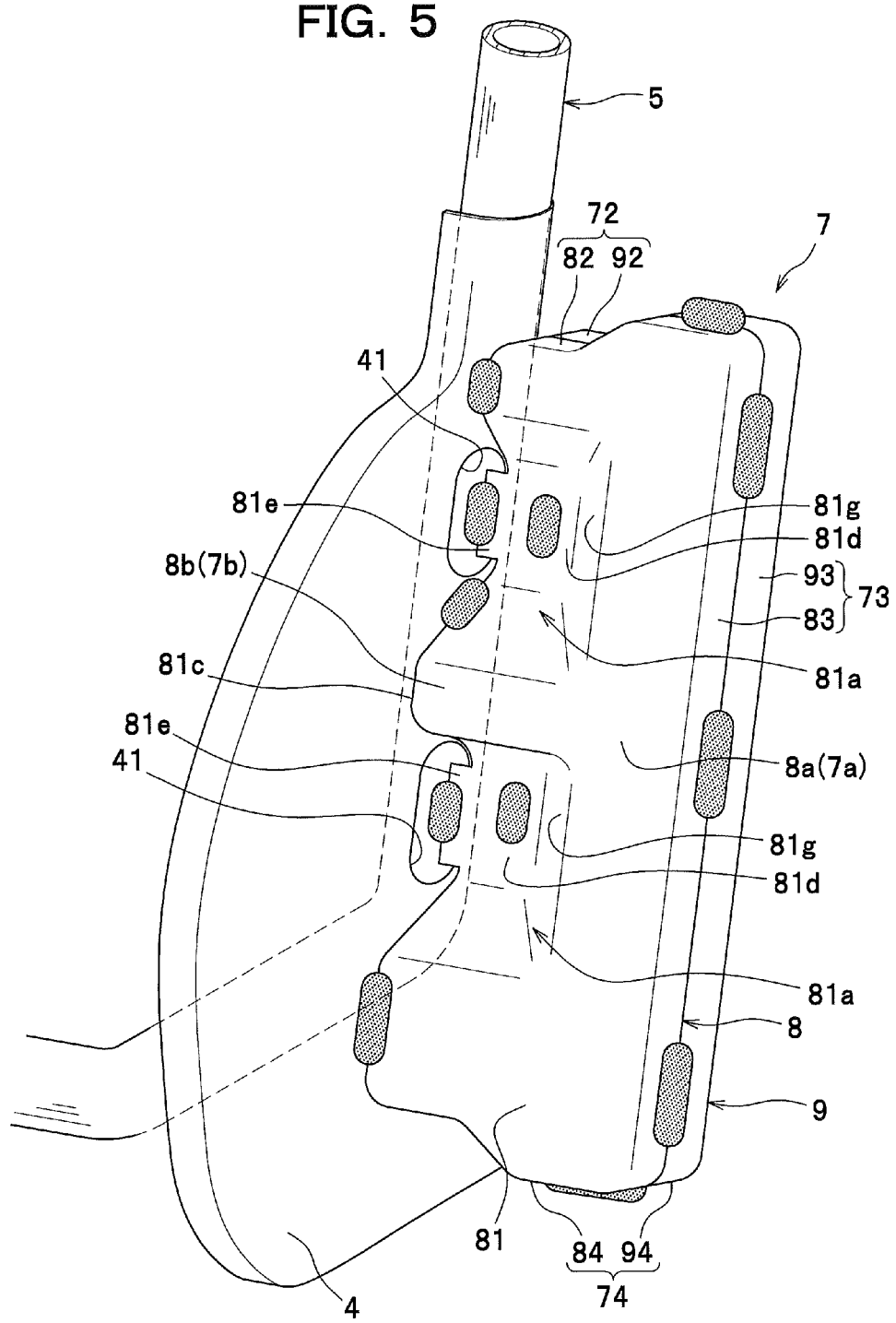
FIG. 5 is an enlarged perspective view of a bracket and its surrounding structure as viewed from the front.

As shown in FIGS. 5, 6, each box-like member 8, 9 (bracket 7) is configured such that the input-side end portion 7a (8a and 9a) stretches out in upward and downward directions wider than the output-side end portion 7b (8b and 9b). To be more specific, as shown in FIG. 7, the bracket 7 has a shape with a closed cross section, and left-side portions (on the laterally outer sides) of the upper wall 72 and the lower wall 74 bulge out upward or downward.

With this configuration, the bulged portions of the bracket 7, that is, an upper end portion (bulge 75) and a lower end portion (bulge 76) of the input-side end portion 7a have a double-wall structure in the lateral direction that is a direction in which a load is received. As a result, the rigidity of the bracket 7 can be enhanced, and thus deformation of the bracket 7 can be suppressed, so that the load can be received from the side panel or the like by the bracket 7 reliably. Moreover, the load can thus be transmitted effectively. Furthermore, a wider area of the input-side end portion 7a (outer wall 73) provided by the bulges 75, 76 makes it possible to reliably receive a load.

Right-side (laterally inner side) walls 75a, 76a (portions of upper wall 72 and lower wall 74) of the bulges 75, 76 provide oblique surfaces which extend from an upper end and a lower end of the bulges 75, 76, respectively, and are angled relative to the lateral direction, such that a width in the upward-and-downward direction of the bracket 7 is gradually made smaller toward the side frame 4. With this configuration, concentration of a stress (as imparted upon receipt of a load) on a part of the upper wall 72 or the lower wall 74 is suppressed, and thus deformation of the bracket 7 can be suppressed, so that the load can be received reliably. Moreover, the load can thus be transmitted properly.

Advantageous effects of the vehicle seat according to the present embodiment as described above are summarized hereinafter.

Since the bracket 7 has a shape with a closed section and the input-side end portion 7a stretches out in upward and downward directions wider than the output-side end portion 7b, the rigidity of the bracket 7 can be increased. Accordingly, deformation of the bracket 7 can be suppressed, and thus the load from the side panel or the like can be received reliably by the bracket 7. Moreover, the load can be transmitted properly from the bracket 7 to the pipe frame 5 and the lower frame 6.

Since the width D1 in the front-rear direction of the lower end portion of the input-side end portion 7a is greater than the width D2 in the front-rear direction of the upper end portion of the input-side end portion 7a, it is ensured that a sufficient area for receiving the load is provided, and thus the load can be received more reliably by the bracket 7, and the load can be transmitted more effectively. In particular, since the transmission of the load in the present embodiment occurs at a lower position through the load transmission part (the lower frame 6 and the lower portion 51 of the pipe frame 5), the greater width D1 in the front-rear direction of the input-side end portion 7a contributes to improved transmission of the load.

Since the upper wall 72 and the lower wall 74 of the bracket 7 include oblique surfaces (walls 75a, 76a) angled relative to the lateral direction such that the width in the upward-and-downward direction of the bracket 7 is gradually made smaller, deformation of the bracket 7 can be suppressed, and thus the load can be received more reliably. Moreover, the load can thus be transmitted more effectively.

Since the bracket 7 is not fixed through the side frame 4 but fixed directly to the pipe frame 5, the side collision load received, irrespective of its angle and magnitude, can be transmitted properly from the bracket 7 to the pipe frame 5 without getting affected by deformation of the side frame 4.

Since the bracket 7 is provided discretely from the pipe frame 5, each member can be formed into any shape freely, and can be made easy to assemble.

Since the bracket 7 and the pipe frame 5 are fixed together through an opening (through hole 41) formed in the side frame 4, the need, for example, to divide the side frame into front and rear parts or upper and lower parts so as to detour around a position in which the bracket and the pipe frame are fixed together can be obviated, and thus the rigidity of the side frame 4 can be enhanced.

Since only part (extension portion 81e) of the bracket 7 is fixed to the pipe frame 5 through the opening (through hole 41), the need to form an opening allowing an entire side portion at a laterally inner side of the bracket to pass therethrough in the side frame can be obviated, and thus the rigidity of the side frame 4 can be further enhanced.

Since the opening formed in the side frame 4 is configured as a through hole 41, the rigidity of the side frame 4 can be further enhanced, in comparison with a configuration in which the opening is shaped as a groove (or a hollow) that opens to the front or to the rear, because an upper portion and a lower portion of the side frame 4 above and below the position in which the bracket 7 and the pipe frame 5 are fixed together can be connected at the front and rear sides of that position.

Since the bracket 7 is fixed to a portion of the pipe frame 5 having a shape with a closed section, the load received by the bracket 7 can be transmitted properly to the load transmission part (the lower frame 6 and the lower portion 51 of the pipe frame 5) through the pipe frame 5 which can be resistant to deformation.

Since the bracket 7 is fixed directly to the both of the side frame 4 and the pipe frame 5, the load received by the bracket 7 is transmitted not only through the pipe frame 5 but also through the side frame 4 to the load transmission part, and thus, the load can be transmitted more effectively.

Since the center 5b of the pipe frame 5 is located within the width in the front-rear direction of the bracket 7, the bracket 7 upon receipt of side collision load can be prevented from slipping out to the front or to the rear on a cylindrical outer surface of the pipe frame 5, and thus, the load can be transmitted more effectively.

Since the bracket 7 is fixed to the portion 5a located at a center in the front-rear direction of the pipe frame 5, the load from the bracket 7 can be transmitted intensively to the central portion 5a at the center in the front-rear direction of the pipe frame 5, and thus, the load can be transmitted more effectively.

Although the embodiments of the present invention have been described above, the present invention may be carried out into practice in appropriately modified configurations, as in the other embodiments described below.

In the above-described embodiments, a cylindrical pipe frame 5 is adopted as an inner frame (reinforcing frame), but the present invention is not limited to this configuration; for example, a pipe frame having a polygonal cross section, a solid cylindrical member, or a solid prismatic member may be usable.

In the above-described embodiments, the force-receiving member is embodied in the bracket 7 composed of two box-like members 8, 9, but the present invention is not limited to this configuration; for example, a bracket composed of a single box-like member, or a bulky plate-like member may be usable.

In the above-described embodiments, the load transmission part is configured as an assembly of the lower frame 6 and the lower portion 51 of the pipe frame 5, but the present invention is not limited to this configuration. For example, in the above-described embodiments, the pipe frame 5 as the inner frame (reinforcing frame) is formed integrally with the load transmission part (lower portion 51), but if the pipe frame is configured to include side portions 52, 53 and an upper portion 54, and is shaped like a letter U which opens toward downward, a separate frame connecting the lower end portions of the pipe frame may be provided as a load transmission part. Alternatively, if the lower portion 51 of the pipe frame 5 in the above-described embodiment is severed, with its midsection cut off, in two portions joined to the lower frame 6, the lower portions 51 extending halfway and the lower frame 6 may be configured as a load transmission part.

In the above-described embodiments, the bracket 7 and the pipe frame 5 are fixed together by welding, but the present invention is not limited to this configuration; for example, a bolt may be applied for fixing these members together.

In the above-described embodiments, the through hole 41 is configured to serve as an opening, but the present invention is not limited to this configuration; for example, the opening may be a hollow which opens to the front or to the rear.

In the above-described embodiments, part of the bracket 7 (i.e., extension portions 81e) is passed through the opening (through holes 41), but the present invention is not limited to this configuration; part of the inner frame (reinforcing frame) may be passed through the opening and fixed directly to the bracket.

In the above-described embodiments, the reinforcing frame (pipe frame 5) is configured to have a shape with a closed section in its entirety, but the present invention is not limited to this configuration; it may be advantageous only if at least a portion of the reinforcing frame to which the force-receiving member is fixed has a shape with a closed section.

In the above-described embodiments, the force-receiving member is configured as a member for receiving a side collision load of a vehicle; however, the present invention is not limited to this configuration, but applicable, for example, to a member for receiving a load from an occupant, such as an arm rest attachment member, or to a member for receiving a load from an air bag upon activation of the air bag, such as an air bag attachment member. Furthermore, for example, a member for receiving a self weight (load) of a motor or the like, such as an attachment member for attaching a motor or the like having a heavy weight, may also be configured as such.

In the above-described embodiments, the force-receiving member is provided at an outer side of the side frame, but the present invention is not limited to this configuration. For example, in a modified embodiment such that a plate-like side frame is further provided at a laterally inner side of the reinforcing frame (pipe frame 5) of the above-described embodiments, an arm rest attachment member or the like as described above may be disposed at a laterally inner side of the side frame, and the arm rest attachment member or the like may be directly fixed to the reinforcing frame.

In the above-described embodiments, the recessed portions 81a, 91a are adopted to provide an uneven shape, but the present invention is not limited to this configuration; a protruded portion may be provided, instead.

In the above-described embodiments, the recessed portions 81a, 91a are both provided in the front wall 81 and the rear wall 91, but the present invention is not limited to this configuration; alternatively, the uneven shape may be provided at least one of the front and rear walls.

In the above-described embodiments, the recessed portion 81a of the front wall 81 is formed at a laterally inner end of the front wall 81 to open to a laterally inner side, but the present invention is not limited to this configuration; alternatively, a recessed portion of a rear wall may be formed at a laterally inner end of the rear wall to open to a laterally inner side.

The recessed portion may be formed at a laterally outer end of a front wall or a rear wall, not to open to a laterally inner side but to open to a laterally outer side. With this configuration, an edge of the force-receiving member at a side from which a side collision load is received can be configured to be bent frontward and rearward, so that the side collision load can be received adequately by the force-receiving member.

The recessed portion may be provided in both of the laterally inner and outer sides. With this configuration, edges of the force-receiving member at both sides from which a side collision load is received and outputted, respectively, can be configured to be bent frontward and rearward, so that the side collision load can be received and outputted adequately.

In the above-described embodiments, the stepped profiles 72a, 73a, 74a are provided continuously across the walls 72-74, but the present invention is not limited to this configuration; a stepped profile (uneven shape) provided merely in at least one of the upper wall and the lower wall may also be advantageous. That is, for example, as shown in FIG. 8(a), a stepped profile 711a may be provided only at an upper wall 711 of a bracket 710. In this configuration, as well, the rigidity of the upper wall 711 can be enhanced so that a load can be transmitted effectively.

Moreover, the stepped profile provided continuously from at least one of the upper wall and the lower wall to the outer wall may suffice. That is, for example, as shown in FIG. 8(b), stepped profiles 721a, 722a may be provided continuously from an upper wall 721 to an outer wall 722 of a bracket 720. In this configuration, as well, since the thicker portion of the outer wall 722 extends continuously to the upper wall 721, a load can be transmitted effectively from the outer wall 722 to the upper wall 721.

In the above-described embodiments, the stepped profile 72a is adopted as an uneven shape, but the present invention is not limited to this configuration; for example, a recess or a protrusion may be adopted.

In the above-described second embodiment, the front wall 81 and the rear wall 91 have oblique surfaces (inner walls 81g, 91g) angled relative to the lateral direction such that the width in the front-rear direction of the bracket 7 is gradually made smaller, but the present invention is not limited to this configuration. For example, an alternative configuration such that only either one of the front wall 81 or the rear wall 91 has such an oblique surface, or another configuration in which neither of them has such an oblique surface may be feasible.

Similarly, in the above-described second embodiment, the upper wall 72 and the lower wall 74 have oblique surfaces (walls 75a, 76a) angled relative to the lateral direction such that the width in the upward-and-downward direction of the bracket 7 is gradually made smaller, but the present invention is not limited to this configuration. For example, an alternative configuration such that only either one of the upper wall 72 or the lower wall 74 has such an oblique surface, or another configuration in which neither of them has such an oblique surface.

In the above-described second embodiment, the output-side end portion 8b of the front wall 81 is configured such that only part (portion which defines an edge of the bottom wall 81d) of the edge 81c is located within the width of the pipe frame 5 in the front-rear direction, but the present invention is not limited to this configuration; for example, the entire edge of the output-side end portion may be located within the width of the pipe frame 5.

In the above-described second embodiment, the bracket 7 (the input-side end portion 7a and the output-side end portion 7b) is configured such that the width D1 in the front-rear direction of its lower portion is greater than the width D2 in the front-rear direction of its upper portion, but the present invention is not limited to this configuration; for example, the width in the front-rear direction of the lower portion of the force-receiving member and the width in the front-rear direction of the upper portion of the force-receiving member may be equal to each other. An alternative configuration in which only the input-side end portion is configured to have a width in the front-rear direction of its lower portion greater than a width in the front-rear direction of its upper portion.

In the above-described second embodiment, the bracket 7 (force-receiving member) is configured such that its input-side end portion 7a stretches out in the upward and downward directions wider than its output-side end portion 7b, but the present invention is not limited to this configuration; for example, the force-receiving member may be configured such that its input-side end potion stretches out in the frontward and/or rearward directions wider than its output-side end portion. Alternatively, the force-receiving member may be configured such that its input-side end portion stretches out in the upward, downward, frontward and rearward directions wider than its output-side end portion.

The invention claimed is:

1. A vehicle seat, comprising:
    left and right side frames which constitute left and right portions of a seat back frame;
    a reinforcing frame disposed adjacent to one side frame in a lateral direction, and configured to reinforce the side frame; and
    a force-receiving member disposed adjacent to the one side frame, provided discretely from the reinforcing frame, and configured to receive a load from another member,
    wherein the force-receiving member is disposed opposite to the reinforcing frame with the side frame disposed therebetween, and directly fixed to the reinforcing frame, and
    wherein the force-receiving member includes upper and lower portions each fixed directly to the one side frame, and a reinforcing frame fixing portion between the upper and lower portions that is fixed directly to the reinforcing frame.

2. The vehicle seat according to claim 1, wherein the force-receiving member and the reinforcing frame are fixed together through an opening formed in the side frame.

3. The vehicle seat according to claim 2, wherein the force-receiving member includes an extension portion provided at a laterally inner side of the recessed portion of the force-receiving member and extending through the opening to the reinforcing frame, the extension portion being fixed to the reinforcing frame.

4. The vehicle seat according to claim 2, wherein the opening is a through hole.

5. The vehicle seat according to claim 1, wherein at least a portion of the reinforcing frame to which the force-receiving member is fixed has a shape with a closed section.

6. The vehicle seat according to claim 1, wherein a center in a front-rear direction of the reinforcing frame is located within a width in the front-rear direction of the force-receiving member.

7. The vehicle seat according to claim 1, wherein the force-receiving member is fixed to a portion of the reinforcing frame at a center in a front-rear direction of the reinforcing frame.

8. The vehicle seat according to claim 1, wherein the force-receiving member includes a front wall and a rear wall and has a shape with a closed cross section, and a portion of at least one of the front wall and the rear wall separate from upper and lower ends thereof provides an uneven shape.

9. The vehicle seat according to claim 1 wherein the force-receiving member includes an upper wall and a lower wall and has a shape with a closed cross section, and a portion of at least one of the upper wall and the lower wall separate from front and rear ends thereof provides an uneven shape.

10. The vehicle seat according to claim 1, wherein each of the upper and lower portions of the force-receiving member includes front and rear portions each fixed directly to the one side frame, and the reinforcing frame fixing portion of the force-receiving member is located between the front and rear portions.

11. The vehicle seat according to claim 1, wherein the force-receiving member includes two or more first portions fixed directly to the one side frame and one or more second portions fixed directly to the reinforcing frame, the first portions and the second portions being disposed alternately.

12. A vehicle seat, comprising:
    left and right side frames which constitute left and right portions of a seat back frame;
    a reinforcing frame disposed adjacent to one side frame in a lateral direction, and configured to reinforce the side frame; and
    a force-receiving member disposed adjacent to the one side frame, provided discretely from the reinforcing frame, and configured to receive a load from another member,
    wherein the force-receiving member is disposed opposite to the reinforcing frame with the side frame disposed therebetween, and directly fixed to the reinforcing frame,
    wherein the force-receiving member includes an upper wall and a lower wall and has a shape with a closed cross section, and a portion of at least one of the upper wall and the lower wall separate from front and rear ends thereof provides an uneven shape, wherein the uneven shape formed in the at least one of the upper wall and the lower wall is of a stepped profile formed by overlapping two plate-like portions.

13. The vehicle seat according to claim 12, wherein the stepped profile is continuously formed from the at least one of the upper wall and the lower wall to an outer wall of the force-receiving member located at a side laterally opposite to that on which the reinforcing frame is provided.

14. The vehicle seat according to claim 13, wherein the force-receiving member is segmented in front and rear halves of box-like members which are fitted together, and the stepped profile is formed as a result of fitting the box-like members together, continuously across the upper wall, the outer wall and the lower wall.

* * * * *